US011887423B2

(12) United States Patent
Steiert et al.

(10) Patent No.: US 11,887,423 B2
(45) Date of Patent: Jan. 30, 2024

(54) DISPLAY UNIT FOR A PASSAGE CONTROL DEVICE

(71) Applicant: Magnetic Autocontrol GmbH, Schopfheim (DE)

(72) Inventors: Martin Steiert, Wehr (DE); Timo Rauer, Rheinfelden (DE)

(73) Assignee: Magnetic Autocontrol GmbH, Schopfheim (DE)

( * ) Notice: Subject to any disclaimer, the term of this patent is extended or adjusted under 35 U.S.C. 154(b) by 0 days.

(21) Appl. No.: 17/922,436

(22) PCT Filed: Feb. 10, 2021

(86) PCT No.: PCT/EP2021/053196
§ 371 (c)(1),
(2) Date: Oct. 31, 2022

(87) PCT Pub. No.: WO2021/219266
PCT Pub. Date: Nov. 4, 2021

(65) Prior Publication Data
US 2023/0169810 A1 Jun. 1, 2023

(30) Foreign Application Priority Data
Apr. 29, 2020 (DE) ........................ 102020111688.8

(51) Int. Cl.
*G07C 9/00* (2020.01)
*G07C 9/10* (2020.01)
(Continued)

(52) U.S. Cl.
CPC ........... *G07C 9/10* (2020.01); *G07C 9/00698* (2013.01); *G07C 9/257* (2020.01); *E06B 11/085* (2013.01)

(58) Field of Classification Search
CPC ...... G07C 9/10; G07C 9/00698; G07C 9/257; E06B 11/085; G09F 9/30; G09F 13/049;
(Continued)

(56) References Cited

U.S. PATENT DOCUMENTS

2004/0008127 A1* 1/2004 Manavi .................. G08G 1/096 340/906
2006/0094511 A1 5/2006 Roireau
(Continued)

FOREIGN PATENT DOCUMENTS

CA 2143647 C * 11/2005 ............. A61B 3/113
CN 209401264 9/2019
(Continued)

OTHER PUBLICATIONS

CN209401264U Conference room state display device, 3 pages. (Year: 2023).*

*Primary Examiner* — Tuyen K Vo
(74) *Attorney, Agent, or Firm* — Volpe Koenig

(57) ABSTRACT

A display unit for a passage control device, having a housing that has a front side, a rear side and an encircling circumferential side connecting the front side and rear side to one another. A display surface is integrated in the front side of the housing. The housing has an optical signaling apparatus that consists of front and rear light bands that are able to be actuated by a computing unit of the passage control device. The front light strip is arranged between the front and circumferential sides and the rear light strip is arranged between the rear and circumferential sides such that the front light strip is visible in a plan view of the front side and the rear light strip is visible in a plan view of the rear side.

15 Claims, 5 Drawing Sheets

(51) Int. Cl.

| | |
|---|---|
| ***G07C 9/15*** | (2020.01) |
| ***G07C 9/25*** | (2020.01) |
| *E06B 11/08* | (2006.01) |

(58) Field of Classification Search

CPC ........... G09F 27/005; G09F 2013/1836; G09F 2013/1881; G09F 23/04; G09F 13/18

See application file for complete search history.

(56) References Cited

U.S. PATENT DOCUMENTS

| | | | | |
|---|---|---|---|---|
| 2007/0071261 | A1* | 3/2007 | Matsuzawa | H04R 19/02 381/191 |
| 2015/0022564 | A1* | 1/2015 | Zhang | G09G 5/10 345/690 |

FOREIGN PATENT DOCUMENTS

| | | | |
|---|---|---|---|
| EP | 2998489 | | 3/2016 |
| EP | 3901924 | A1 * | 10/2021 |
| WO | 2008081383 | | 7/2008 |
| WO | 2010078856 | | 7/2010 |

* cited by examiner

DISPLAY UNIT FOR A PASSAGE CONTROL DEVICE

INCORPORATION BY REFERENCE

The following documents are incorporated herein by reference as if fully set forth: PCT Application No. PCT/EP2021/053196, filed Feb. 10, 2021.

TECHNICAL FIELD

The invention relates to a display unit for a passage control device, and to a passage control device having such a display unit. The display unit comprises a housing having a front side, a rear side, as well as a circumferential side encircling and connecting the front and rear sides to one another. In the case of a cuboid housing, the circumferential side is formed for example by an upper side, a lower side and two lateral narrow sides, which may transition into one another smoothly or via outer edges. A display surface is integrated into the front side of the housing.

BACKGROUND

Passage control devices are widely used. They are found wherever specially secured areas are intended to be accessible to persons, but where this access must be carried out in a controlled fashion. Especially for protected areas which may be entered only with specific authorization, passage control devices having a display unit are used, for example for access to factory premises, access to sports facilities such as stadiums, swimming pools and the like, for charging an entry fee, access to security areas in airports, access to subway stations, for border controls, for example at railway stations, and the like. The passage control device is in these cases provided with barrier elements which either allow or block passage for persons, and which do so depending on a specific authorization of the respective person. This authorization may be an entry ticket, a membership card, a passport or, in airports, a boarding pass. Alternatively or in addition to verifying the correct ownership of a passport, for example, the authorization may also be carried out by detecting biometric data with which a person who has access authorization may be uniquely identified. Biometric data may for example be a person's face, fingerprints, iris or voice.

For access to security-critical areas, particularly in airports, or for a border crossing, not only is a simple check of specific access authorizations usually carried out, for example by placing an identification document on a scanner, but in order to detect unauthorized transfer or forgeries of such specific access authorizations, additional checks are also carried out, in particular on biometric features or questions which must be answered correctly by the person seeking access in order to allow passage.

For this purpose, passage control devices are equipped with a display unit of the present type, which in the front side of its housing comprises a display surface for optical visualization of variable items of information, which is usually formed by an electronic screen (display) although it may also be configured more simply, example to represent pictograms. By means of the display surface, the person to be checked may be shown the method (standing still, looking in a particular direction, pressing on a finger, etc.) which is necessary for a further check, or the person is requested to input particular items of information. Visualization of the result of the check is also possible by means of such a display unit. An example of such a passage control device having a display unit of the type mentioned at the outset may be found in WO 2010/078856 A1.

Moreover, in security-critical areas, and again particularly in airports, the passage through a passage control device is additionally monitored by security personnel, a security operative usually keeping their eye more or less continuously on a plurality of passage control devices. In this case, it is desirable for the security personnel to be informed in real-time about the result of the check of the access authorization in the individual passage control devices, in order to be able to assess whether the control process has taken place correctly. Since the security personnel ought not to divert their view from the passage control devices for this purpose, for example in order to look at a computer screen, this information should be emitted optically in the region of the respective passage control, for which purpose an optical signaling apparatus would optimally be provided.

SUMMARY

The invention is therefore based on the object of refining a passage control device and a display unit for such a passage control, having a housing which comprises a front side, a rear side and a circumferential side encircling and connecting the front and rear sides to one another, and in which a display surface is integrated in the front side of the housing, in such a way that an optical signaling apparatus which is perceptible from outside the passage control device is provided.

This object is achieved by a display unit having one or more of the features disclosed herein, and by a passage control device having one or more of the features disclosed herein. Preferred design embodiments and refinements of the display unit according to the invention are set forth below and in the claims A display unit according to the invention, which consists substantially of a housing having a front, rear and circumferential side as well as a display surface integrated in the front side of the housing, thus additionally comprises an optical signaling apparatus which consists of a front and a rear light band, actuatable by a computer unit of the access control device, which can at least be turned on and off, the front light band being arranged between the front side and the circumferential side and the rear light band being arranged between the rear side and the circumferential side of the housing, in such a way that the front light band is visible in a plan view of the front side and the rear light band is visible in a plan view of the rear side of the housing.

With the signaling apparatus directly on the housing of the display unit, several advantageous effects are derived in the interaction of a computer unit of the passage control device with a person inside the passage control device. First, the result of the check may be signaled to this person, for example with a green light signal, if the access is allowed, and with a red light signal if the check has found that passage is not possible, or if for example the check of biometric data needs to be repeated. For persons who are unfamiliar with dealing with passage control devices, as is usual particularly in airports, the signaling apparatus may draw the attention of the person entering the passage control device to the display surface in the housing of the display unit, for example by a flashing light signal. As a secondary effect, the person spontaneously and without a special request turns toward the display unit so that a scanner or a camera, fitted for instance on or in the housing of the display unit, can correctly acquire biometric data which are to be read from the face or the eyes.

According to the invention, the signaling apparatus consists of two light bands, specifically a front light band which is seen by the person located in the passage control device, and a rear light band which is primarily aimed at the security operative who typically monitors a plurality of passage control devices. In any event, however, the arrangement according to the invention of two light bands ensures that the signaling apparatus of the display unit according to the invention can be seen by the security operative from all directions. For this purpose, the display unit is arranged in the access control device according to the invention in such a way that it protrudes upward beyond the other elements of the access control device.

In the scope of the invention, it is particularly advantageous for the two light bands of the signaling apparatus to be configured so as to encircle the housing, which optimizes the visibility for the security operative from all spatial directions.

Particularly preferably, the display element according to the invention is equipped with a housing in frame design and comprises at least the following elements: a substantially plate-shaped display element for the front side of the housing, a rear-side plate for the rear side of the housing, an inner frame arranged between the display element and the rear-side plate, two translucent front and rear luminous frames, respectively forming a light band, arranged on the inner frame and facing on the one hand toward the front side and on the other hand toward the rear side of the housing, or two such arranged on both sides of the inner frame, that is to say on the one hand between the inner frame and the display element and on the other hand between the inner frame and the rear-side plate, and a cover frame encircling and externally covering the inner frame and forming the circumferential side. The at least one light strip, for example an LED light strip, the light of which is emitted outward through the translucent luminous frame, may be held on the inner frame. The plate-shaped display element is preferably a display element which consists of an electronic screen and at least some electronic components required for its operation.

The frame-shaped elements may be assembled with the rear-side plate and the plate-shaped display element in an efficient and straightforward way, for example screwed to one another, so that not only easy mounting but also a straightforward possibility of maintenance and repair are obtained, which has a positive effect on the durability of the display element. The plate-shaped display element is preferably prefabricated as a display element with all necessary electronic components and contacts, so that there is no additional mounting complexity in this case.

The two light bands of the display unit according to the invention may respectively be activated synchronously and emit a synchronous light signal. It may, however, also be advantageous to actuate the two light bands separately, in particular individually or using different colors, so that they can emit different light signals. For example, the person in the passage control device may be given a green light signal in order to signal that passage is allowed, while at the same time a light signal, for example a yellow light signal, on the rear light band signals to the security operative that an elevated temperature has been measured for this person or the person should routinely be randomly checked in more detail. For this purpose, it is advantageous in the preferred frame design according to the invention of the housing for a front light strip oriented toward the front side of the housing and a rear light strip oriented toward the rear side of the housing, which are optically connected respectively to the front and rear luminous frame, to be held on the inner frame, a separating element being provided on the inner frame in order to separate the front light strip with the front luminous frame optically from the rear light strip with the rear luminous frame. This separating element may also be configured in the form of a frame in order to ensure easy mounting.

In order to be able to use standardized elements, in particular for the display element, it is advantageous for the housing to be configured substantially in the shape of a cuboid and for the circumferential side correspondingly to consist of an upper side, a lower side and two lateral narrow sides, which may transition into one another with rounded corners. This does not, however, preclude the possibility that the housing may have other shapes in the scope of the invention, for example circular disk-shaped, elliptically rounded, or the like.

As already mentioned, the optical signaling apparatus in the housing of the display unit according to the invention offers the advantage that the attention of persons inside the passage control device may be drawn to the display unit, so that they spontaneously turn toward it. It is therefore preferred in the scope of the present invention for contactless detection means, which consist for example of laser-based or other optical sensors, a thermal imaging camera or at least one camera for detecting biometric data, or sensors operating on the basis of radar or acoustically, in particular with ultrasound, to be integrated into the front side of the housing. Preferably, two sensors or cameras spaced apart from one another are used in order to be able to record stereoscopic images or, with an optical mode of operation, to eliminate from the recordings reflections which are often unavoidable in the case of spectacle wearers. It may in this case furthermore be advantageous to integrate illumination elements into the housing of the display unit.

Furthermore, acoustic signal transducers may be integrated, or other sensors may be provided visibly or invisibly, for example a thermal sensor for measuring the body temperature of the person inside the passage control device, in the housing of the display unit according to the invention. Fingerprint scanners and the like may also be integrated into the front side of the housing.

It is particularly preferred for the display surface of the housing to be configured by means of a touch-sensitive display element or by gesture recognition, or gesture control, as an interface for the input and output of data into and from a computer unit of the access control device. It is in this way possible to query, in the form of a dialogue, items of information of the person in the passage control device which may be used for the decision of whether passage is or is not (yet) allowed.

Lastly, it may be advantageous to assemble at least one luminous band on the housing of the display unit according to the invention from individually actuatable light elements, or to illuminate it with such light elements, so that a moving light sequence may be generated, for example. This extends the possibilities in comparison with pure color assignment of signaled events, or states.

BRIEF DESCRIPTION OF THE DRAWINGS

Exemplary embodiments of a display unit configured according to the invention and of a passage control device configured according to the invention will be described and explained in more detail below with the aid of the appended drawings, in which.

DETAILED DESCRIPTION

Figure 1:
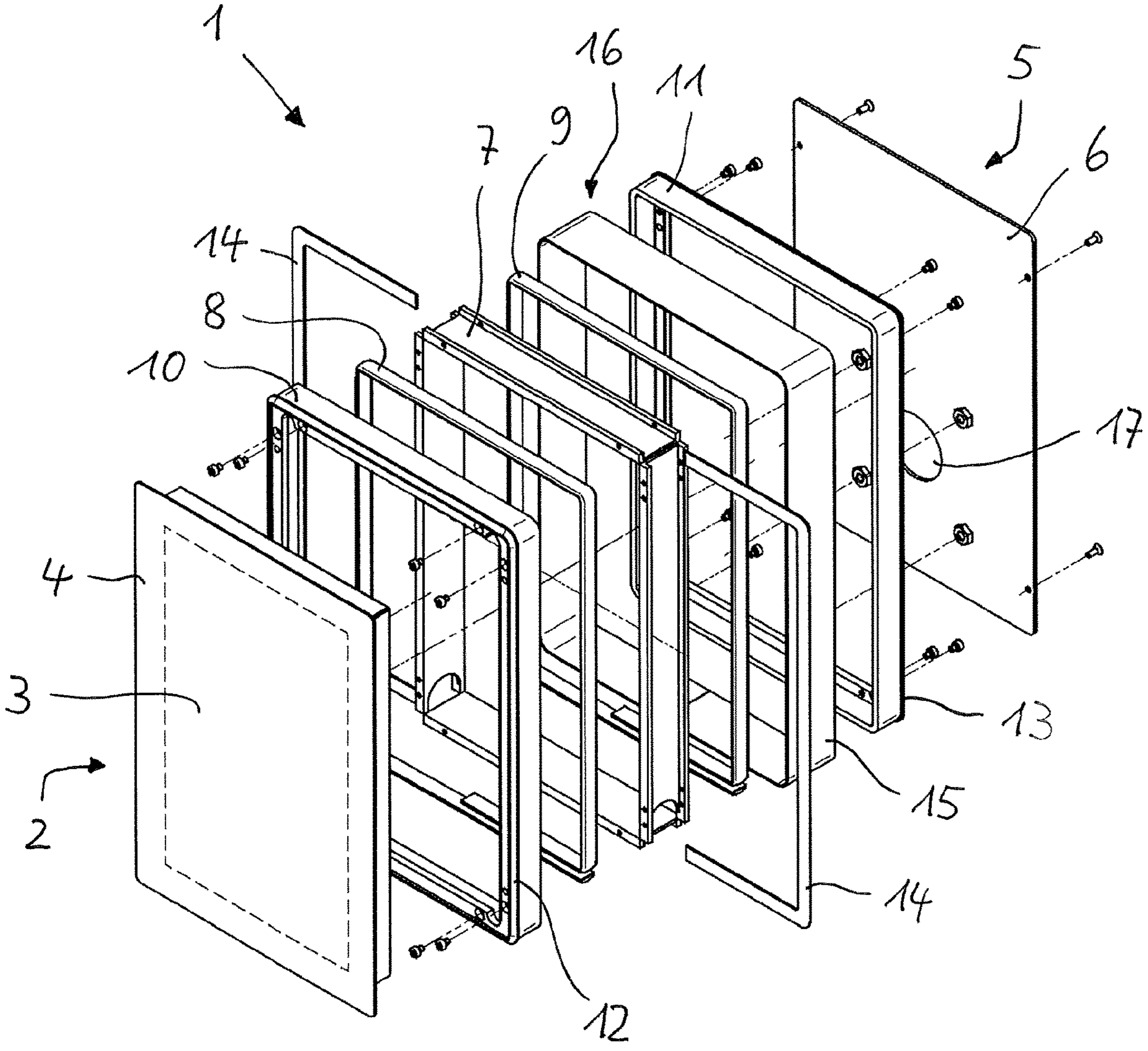
FIG. 1 shows an exploded illustration of a first exemplary embodiment of a housing of a display unit configured according to the invention.

FIG. 1 illustrates by way of example the way in which the frame design preferred according to the invention may be configured for a housing 1 of a display unit according to the invention. A front side 2 of the housing 1 with a display surface 3 is formed by a display element 4, which is configured in a commercially available fashion together with the electronics required for the indication and optionally a touch-sensitive surface or a gesture recognition function, and which may correspondingly be produced economically. A rear side 5 of the housing 1 is formed by a rear-side plate 6, which in the present case is made of aluminum or steel and may be releasably connected to the display element 4 by means of a screw connection.

An inner frame 7 is used as a skeleton for fastening further frame elements and for receiving a front light strip 8 and a rear light strip 9, which may be placed in an encircling manner on the inner frame and contacted there. These are commercially available LED light strips which can generate light with different colors.

A front luminous frame 10 consisting of translucent material, which extends as far as the front side 2 of the housing 1, or the display element for forming the front side 2, is arranged on the inner frame. The luminous frame 10 is illuminated by the front light strip, which is arranged directly inside the front luminous frame 10. With a part projecting all around, it forms a front light strip 12 which can be seen from the front since the projecting part of the front luminous frame 10 extends around the display element 4 as seen from the front. Correspondingly, a rear luminous frame 11 consisting of the same translucent material is arranged on the inner frame 7 toward the rear-side plate 6 and, in the assembled state of the housing 1, surrounds the rear light strip 9 and is illuminated by the latter so that a circumferentially projecting part of the rear luminous frame 11 in turn forms a rear light band 13 which, as seen from the rear side, surrounds the rear-side plate 6 in an encircling manner. Preferably, the front luminous frame 10 and the rear luminous frame 11 are formed from identical components.

A two-part separating element 14 is pushed onto the inner frame 7 between the front light strip 8 and the rear light strip 9, and optically separates these two light strips 8, 9 from one another. The radial extent of the separating element 14 furthermore causes optical separation of the front luminous frame 10 from the rear luminous frame 11 by these abutting one another not directly but respectively on one side of the separating element 14.

The inner frame 7, the light strips 8, 9, the separating element 14 and the largest parts of the luminous frames 10, 11 are covered externally by a cover frame 15, which forms the encircling circumferential side 16 of the housing 1 that in the present case is again made of aluminum or steel and therefore ensures a uniform appearance of the housing 1. A part of the rear luminous frame 11 remains visible as an encircling rear light band 13 between the cover frame 15 and the rear-side plate 6. Correspondingly, a part of the front luminous frame 10 remains visible as a front light band 12 between the cover frame 15 and the display element 4 since it projects beyond the rest of the front luminous frame and abuts with the projecting part on the cover frame 15.

Lastly, a connection opening 17 through which the electrical leads for the voltage supply and for the signal transmission can be routed into the housing 1 is provided in the rear-side plate 6.

It is clear with the aid of FIG. 1 that the frame design preferred according to the invention allows not only uncomplicated mounting of the housing 1 and a high degree of service friendliness, but also economical production of the housing 1, or of the display unit as a whole.

Figure 2A:
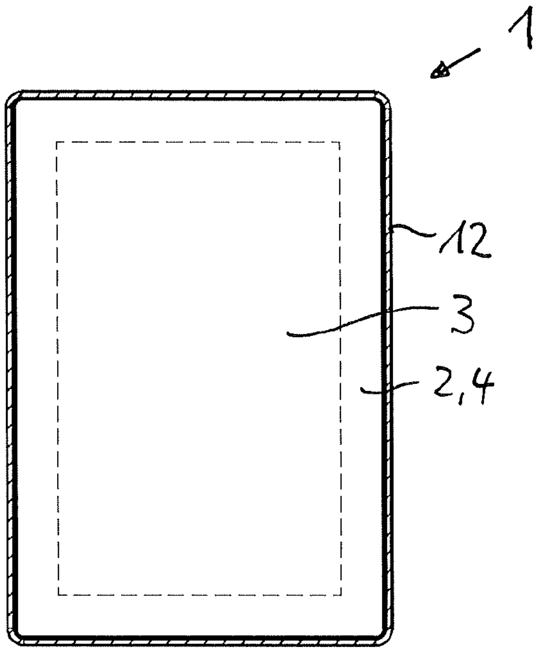
FIGS. 2A-2D show a front view (FIG. 2A), lateral view (FIG. 2B), rear view (FIG. 2C), and view from above (FIG. 2D) of the housing of FIG. 1.
Figure 2B:
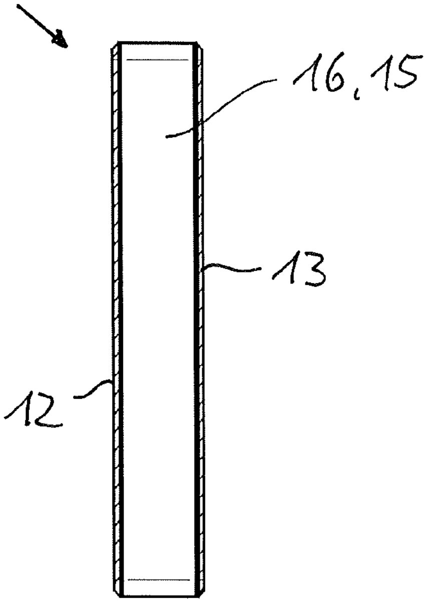
Figure 2C:
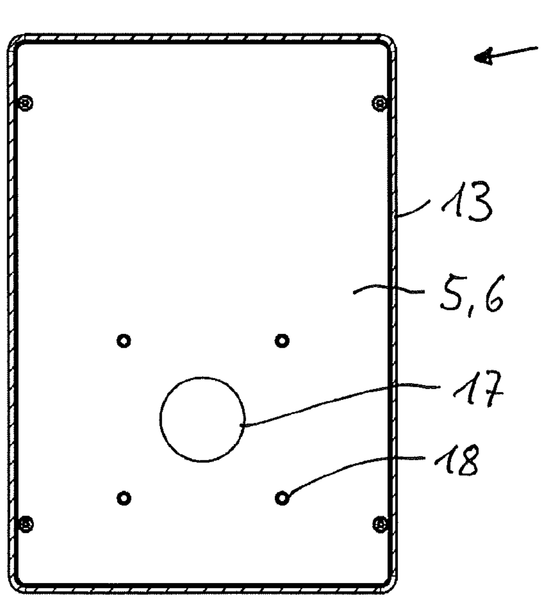
Figure 2D:
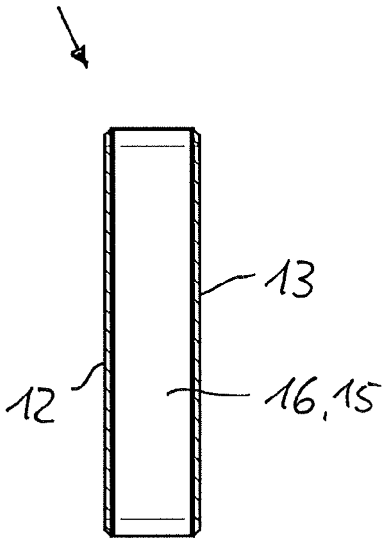
Figure 3:
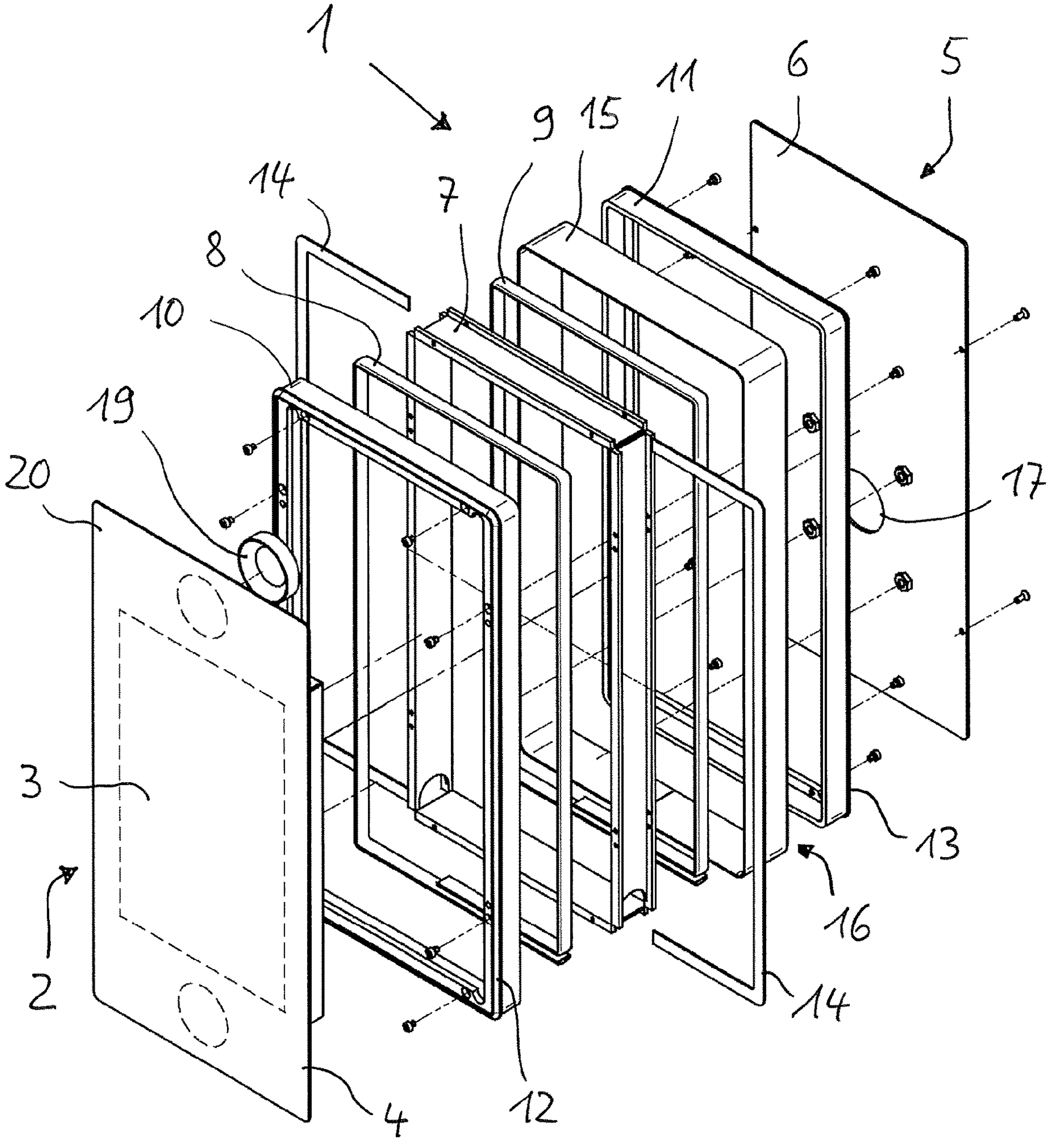
FIG. 3 shows an exploded illustration of a second exemplary embodiment of a housing of a display unit configured according to the invention.
Figure 4A:
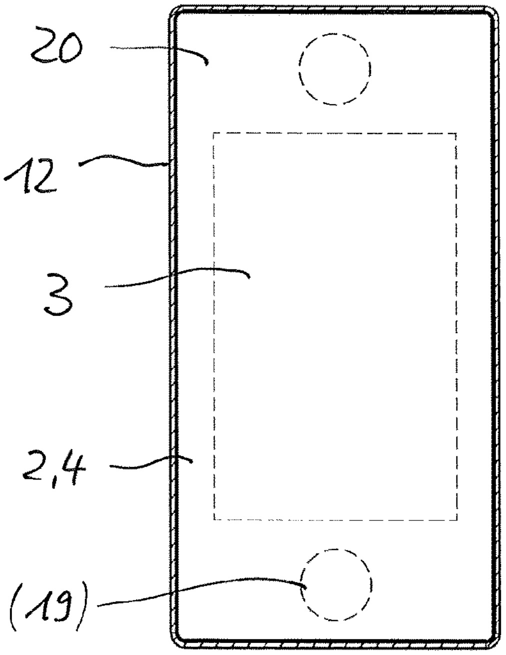
FIGS. 4A-4D show a front view (FIG. 4A), lateral view (FIG. 4B), rear view (FIG. 4C), and view from above (FIG. 4D) of the housing of FIG. 3.
Figure 4B:
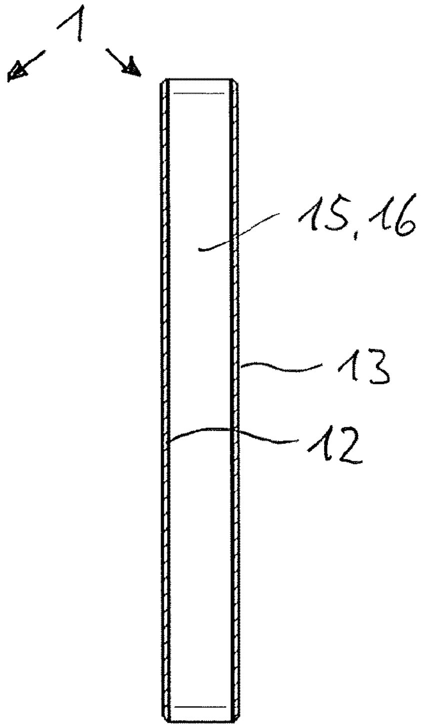
Figure 4C:
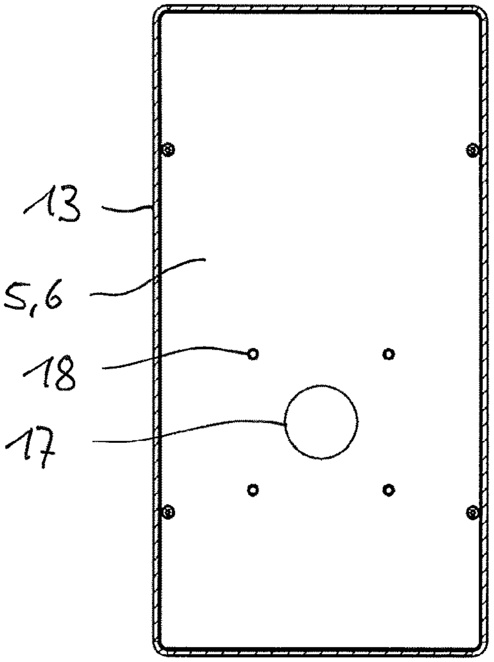
Figure 4D:
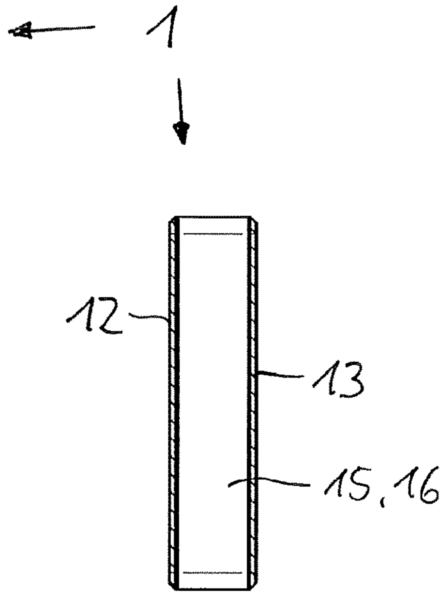

FIG. 2A is a front view, FIG. 2B a lateral view, FIG. 2C a rear view and FIG. 2D a view from above of the housing 1 of FIG. 1 in the assembled state.

With the aid of FIGS. 2A-2D, it may be seen that the front light band 12 surrounds the front side 2 of the housing 1 with its display surface 3 and is visible from the front, while the rear light band 13 surrounds the rear side 5 of the housing 1 and is visible from the rear (FIG. 2A, FIG. 2C). FIGS. 2B and 2D illustrate that the two light bands 12, 13 enclose the circumferential side 16 of the housing 1 between them and correspondingly may be seen from the side and from above simultaneously. Overall, the various views of FIGS. 2A-2D make it clear that at least one of the two light bands 12, 13 of the housing 1 may be seen from any spatial direction. Lastly, FIG. 2C also shows that the connection opening 17 in the rear-side plate 6 is surrounded by four mounting points 18 for a VESA mount. The rear-side plate 6 may be releasably connected to the display element 4 by means of screw connections, so that the remaining parts of the housing 1 can be fixed.

Illustrated in FIGS. 3 and 4A-4D is another exemplary embodiment of a housing 1 of a display unit according to the invention, the illustrations corresponding to FIG. 1 and FIGS. 2A-2D respectively. This housing 1 is configured substantially identically to the exemplary embodiment represented in FIGS. 1 and 2A-2D; it differs therefrom merely by a slight elongation of the shape of the housing 1 and by two cameras 19, 19' provided on the front side 2, of which only the upper camera 19 is symbolically indicated. For this purpose, the display element 4 has been extended upward and downward by means of a cover panel 20 so that the display surface 3 is framed upward and downward by the two cameras 19, 19'. These cameras 19, 19' may record stereoscopic images, or the two images generate a redundancy, for example in order to be able to computationally eliminate perturbing reflections or to select the better image of the two cameras 19, 19'. Because of the cover panel 20, it is not readily perceptible for a person located in the passage control device whether the housing 1 also contains cameras or other sensors, for example temperature measuring instruments or the like, besides the display surface 3.

Figure 5:
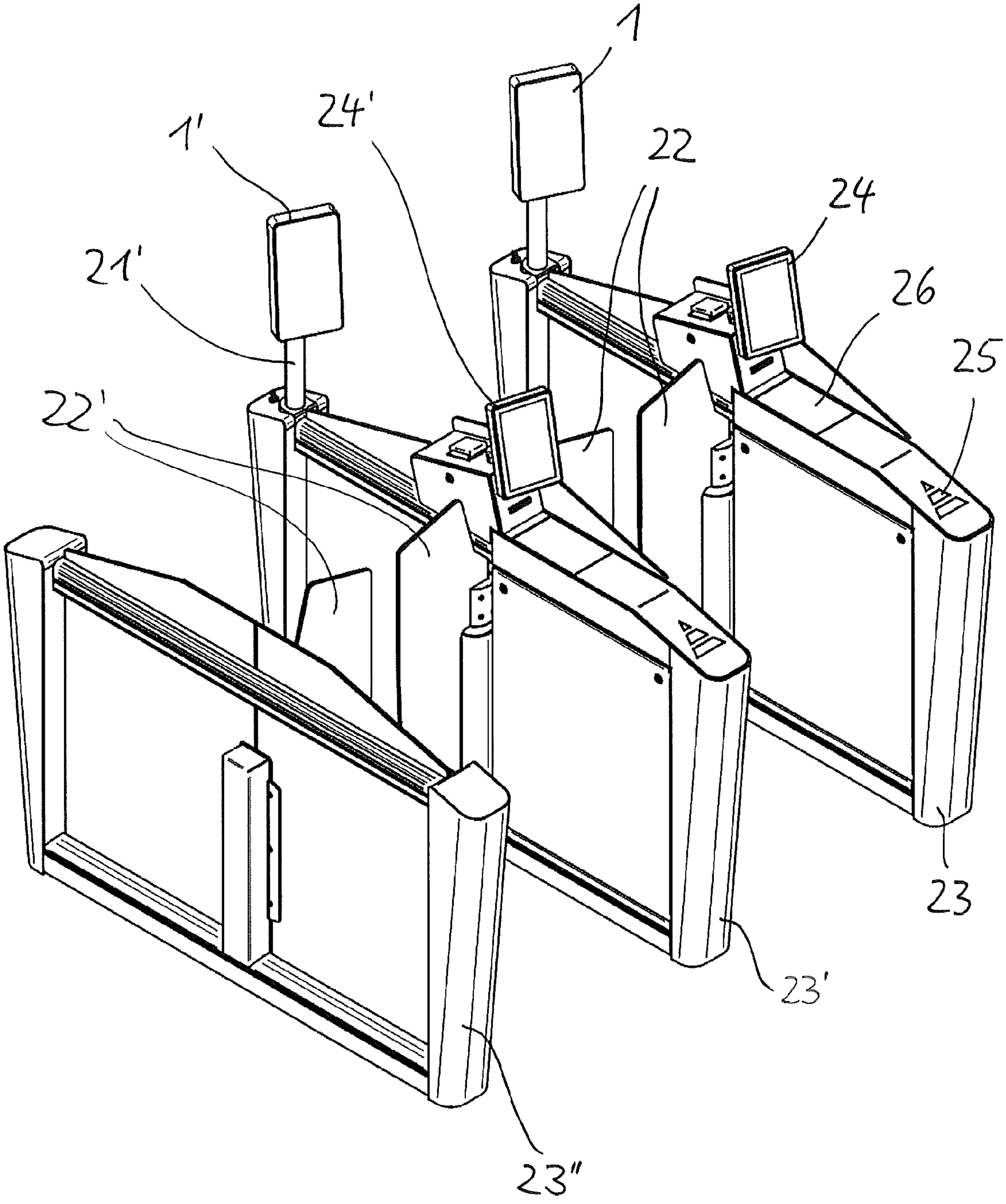
FIG. 5 shows a schematic illustration of two passage control devices configured according to the invention.

Lastly, FIG. 5 shows an example of two passage control devices arranged next to one another, which are equipped with display unit according to the invention, in a schematic illustration. A first display unit according to the invention, which corresponds to the exemplary embodiment of FIGS. 3 and 4A-4D, is seated with its housing 1 on a pole 21 so that the housing 1 protrudes upward beyond the other elements of the passage control device and may thus be seen from all directions. A second display element 24 configured according to the invention, which corresponds to the exemplary embodiment of FIGS. 1 and 2A-2D, is arranged in the vicinity of a reading unit 26. The passage control device furthermore consists of a barrier element 22 configured as a swing turnstile, two side walls 23, 23' for forming a single-person corridor, a readiness indicator 25, the reading unit 26 and a computer unit (not visible here) integrated in the side wall 23 in order to control the processes, and a drive unit for the barrier element 22.

LIST OF REFERENCES

1 Housing
2 Front side
3 Display surface
4 Display element
5 Rear
6 Rear-side plate
7 Inner frame
8 Front light strip
9 Rear light strip
10 Front luminous frame
11 Rear luminous frame
12 Front light band
13 Rear light band
14 Separating element
15 Cover frame
16 Circumferential side
17 Connection opening
18 Mounting point
19 Camera
20 Cover panel
21 Pole
22 Barrier element
23 Side wall
24 Display unit (second)
25 Readiness indicator
26 Reading unit

The invention claimed is:

1. A display unit for a passage control device, the display unit comprising:

a housing (1) including a front side (2), a rear side (5) and a circumferential side (16) encircling and connecting the front and rear sides to one another;

a display surface (4) integrated in the front side (2) of the housing (1);

the housing (1) further comprises an optical signaling apparatus including a front light band (12) and a rear (13) light band, the front light band (12) being arranged between the front side (2) and the circumferential side (16), and the rear light band (13) being arranged between the rear side (5) and the circumferential side (16), such that the front light band (12) is visible in a plan view of the front side (2) and the rear light band (13) is visible in a plan view of the rear side (5).

2. The display unit as claimed in claim 1, wherein the front and rear light bands (12, 13) are configured to encircle the housing (1).

3. The display unit as claimed in claim 1, wherein the housing (1) is constructed with a frame and comprises a substantially plate-shaped display element configured as a display element (4) for the front side (2), a rear-side plate (6) for the rear side (5), an inner frame (7) arranged between the plate-shaped display element and the rear-side plate, two translucent front (10) and rear (11) luminous frames (11), respectively forming the front light band and the rear light band (12, 13), arranged on the sides next to the inner frame (7), and a cover frame (15) encircling and externally covering the inner frame (7) and forming the circumferential side (16).

4. The display unit as claimed in claim 3, further comprising at least one light strip (8, 9) held on the inner frame (7).

5. The display unit as claimed in claim 4, wherein the at least one light strip includes a front light strip (8) oriented toward the front side (2) of the housing (1) and a rear light strip (9) oriented toward the rear side (5) of the housing (1), which are optically connected respectively to the front (10) and rear (11) luminous frame, are held on the inner frame (7), and a separating element (14) is provided on the inner frame (7) that separates the front light strip (8) and the front luminous frame (10) optically from the rear light strip (11) and the rear luminous frame (11).

6. The display unit as claimed in claim 1, wherein the housing (1) is substantially shaped as a cuboid and the circumferential side (16) consists of an upper side, a lower side and two lateral narrow sides.

7. The display unit as claimed in claim 1, further comprising a contactless detector operating with electromagnetic or acoustic waves integrated into the front side (2) of the housing (1).

8. The display unit as claimed in claim 1, further comprising an electromagnetic illumination element integrated into the front side (2) of the housing (1).

9. The display unit as claimed in claim 1, further comprising a thermal imaging camera or thermal sensors integrated into the front side (2) of the housing (1).

10. The display unit as claimed in claim 1, further comprising an acoustic signal transducer is moreover integrated into the housing (1).

11. The display unit as claimed in claim 1, wherein the display surface (3) includes a touch-sensitive display element (4) configured as an interface for the input and output of data.

12. The display unit as claimed in claim 1, wherein the display surface (3) is provided with a gesture recognition apparatus and is configured as an interface for the input and output of data by gesture control.

13. The display unit as claimed in claim 1, wherein the front (12) and the rear (13) light band are actuatable using different colors.

14. The display unit as claimed in claim 1, wherein at least one of the two light bands (12, 13) is assembled from individually actuatable light elements or is illuminated by individually actuatable light elements.

15. An access control device, comprising the display unit as claimed in claim 1, wherein the housing (1) of the display unit is arranged protruding upward beyond other elements of the access control device.

* * * * *